United States Patent
Heinemann

(10) Patent No.: US 9,539,797 B2
(45) Date of Patent: Jan. 10, 2017

(54) TRAVERSE WOUND DOUBLE-SIDED PRESSURE SENSITIVE ADHESIVE TAPE

(71) Applicant: Rayven, Inc., Saint Paul, MN (US)

(72) Inventor: Joseph S. Heinemann, Saint Paul, MN (US)

(73) Assignee: Rayven, Inc., Saint Paul, MN (US)

( * ) Notice: Subject to any disclaimer, the term of this patent is extended or adjusted under 35 U.S.C. 154(b) by 0 days.

(21) Appl. No.: 14/080,491

(22) Filed: Nov. 14, 2013

(65) Prior Publication Data

US 2015/0132523 A1 May 14, 2015

(51) Int. Cl.
*C09J 7/02* (2006.01)
*B32B 37/12* (2006.01)
*B32B 37/14* (2006.01)
*C09J 7/00* (2006.01)
*C08K 7/02* (2006.01)

(52) U.S. Cl.
CPC ............... *B32B 37/12* (2013.01); *C09J 7/00* (2013.01); *C09J 7/0228* (2013.01); *C08K 7/02* (2013.01); *C09J 2201/606* (2013.01); *C09J 2205/102* (2013.01); *Y10T 428/14* (2015.01); *Y10T 428/1476* (2015.01)

(58) Field of Classification Search
CPC ............ Y10T 428/14; Y10T 428/1362; Y10T 428/1366; Y10T 428/1369; Y10T 428/1476; C09J 7/0228; C09J 7/0207; C09J 2201/128; C09J 7/0232; C09J 7/00; C09J 2201/606; C09J 2205/102; B32B 37/12; C08K 7/02
See application file for complete search history.

(56) References Cited

U.S. PATENT DOCUMENTS

| | | |
|---|---|---|
| 2,395,668 A | 2/1946 | Kellgren et al. |
| 2,496,349 A | 2/1950 | Kellgren et al. |
| 2,822,290 A | 2/1958 | Webber |
| 2,985,554 A | 5/1961 | Dickard |
| 3,236,677 A | 2/1966 | Bradstreet |
| 3,533,899 A | 10/1970 | Kapral |
| 3,850,784 A | 11/1974 | Lavender |
| 3,853,662 A | 12/1974 | Yazawa et al. |
| 3,859,156 A | 1/1975 | Yazawa et al. |

(Continued)

FOREIGN PATENT DOCUMENTS

| | | |
|---|---|---|
| CN | 101484312 A | 7/2009 |
| CN | 102827553 A | 12/2012 |

(Continued)

*Primary Examiner* — Patricia L Nordmeyer
(74) *Attorney, Agent, or Firm* — Thomas J. Oppold; Larkin Hoffman Daly & Lindgren, Ltd.

(57) ABSTRACT

A spool of traverse wound double-sided PSA tape and method of making same. The PSA tape includes an adhesive body with an upper adhesive surface releasably adhered to a bottom side of a release liner having a release value. At least one reinforcing strand is disposed longitudinally through the adhesive body. The PSA tape is traverse wound onto a core in successive winding layers with each successive winding layer producing an outer winding layer with the bottom side of its adhesive body crossing at an angle over the top side of the release liner of a preceding inner winding layer. The tensile strength of the at least one reinforcing strand is greater than a Resistance Bond of the outer winding layer to the preceding inner winding layer.

26 Claims, 12 Drawing Sheets

(56) References Cited

U.S. PATENT DOCUMENTS

| | | | |
|---|---|---|---|
| 4,052,242 | A | 10/1977 | Yazawa et al. |
| 4,241,198 | A | 12/1980 | Kobayashi |
| 4,339,486 | A | 7/1982 | Shimamoto et al. |
| 4,525,317 | A | 6/1985 | Okada et al. |
| 4,614,677 | A | 9/1986 | Pennace et al. |
| 4,762,680 | A | 8/1988 | Pennace et al. |
| 5,312,500 | A | 5/1994 | Kurihara et al. |
| 6,063,492 | A | 5/2000 | Kurihara et al. |
| 8,409,683 | B2 | 4/2013 | Kosaka et al. |
| 2004/0224117 | A1 | 11/2004 | Amano |
| 2007/0036992 | A1 | 2/2007 | Tanaka et al. |
| 2009/0202772 | A1 | 8/2009 | Vanderzanden et al. |
| 2009/0258225 | A1 | 10/2009 | Nishida et al. |
| 2010/0119803 | A1 | 5/2010 | Kosaka et al. |
| 2010/0143711 | A1* | 6/2010 | Daigaku et al. ............ 428/343 |
| 2010/0178824 | A1 | 7/2010 | Stark et al. |
| 2010/0285257 | A1* | 11/2010 | Bullock ................ C09J 7/0246 428/40.1 |

FOREIGN PATENT DOCUMENTS

| | | |
|---|---|---|
| DE | 4442507 A1 | 6/1996 |
| DE | 10160323 A1 | 6/2003 |
| EP | 0757127 A1 | 5/1997 |
| EP | 1041131 A1 | 4/2000 |
| EP | 2039506 A1 | 3/2009 |
| GB | 1248731 | 10/1971 |
| JP | 53157151 | 5/1952 |
| JP | 59021766 A | 2/1984 |
| JP | 62028226 A | 2/1987 |
| JP | 63149942 U | 10/1988 |
| JP | 63199147 U | 12/1988 |
| JP | 2008012798 A | 1/2008 |
| WO | 0190269 A1 | 11/2001 |
| WO | 2007147811 A8 | 12/2007 |

* cited by examiner

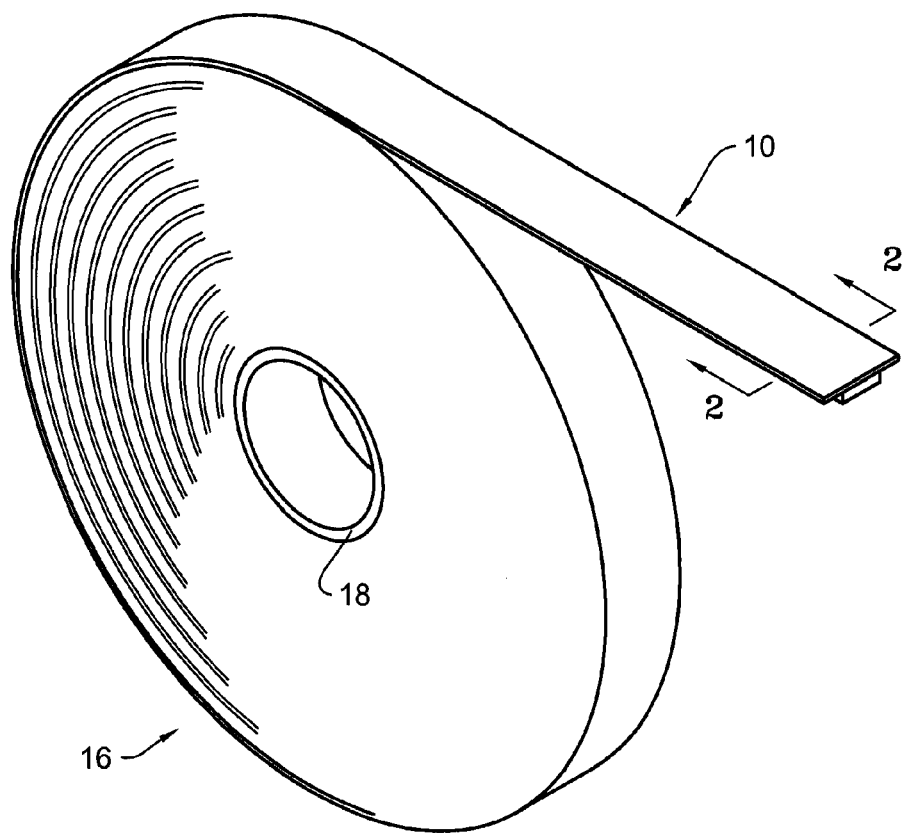
FIG. 1
(Prior Art)
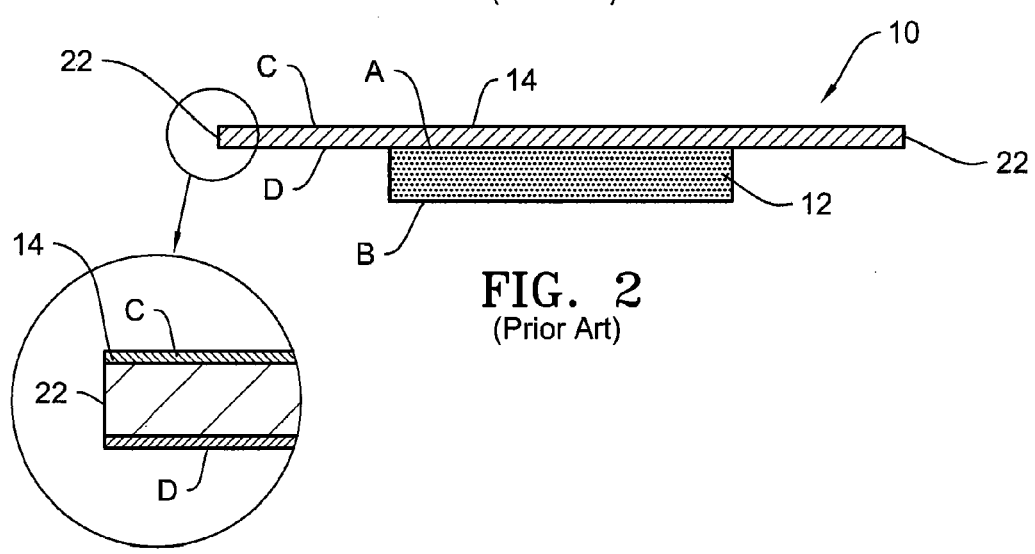
FIG. 2
(Prior Art)
FIG. 2A

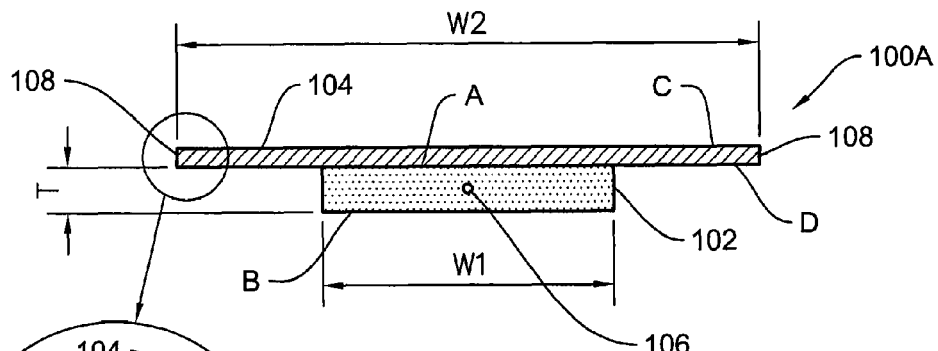
FIG. 13
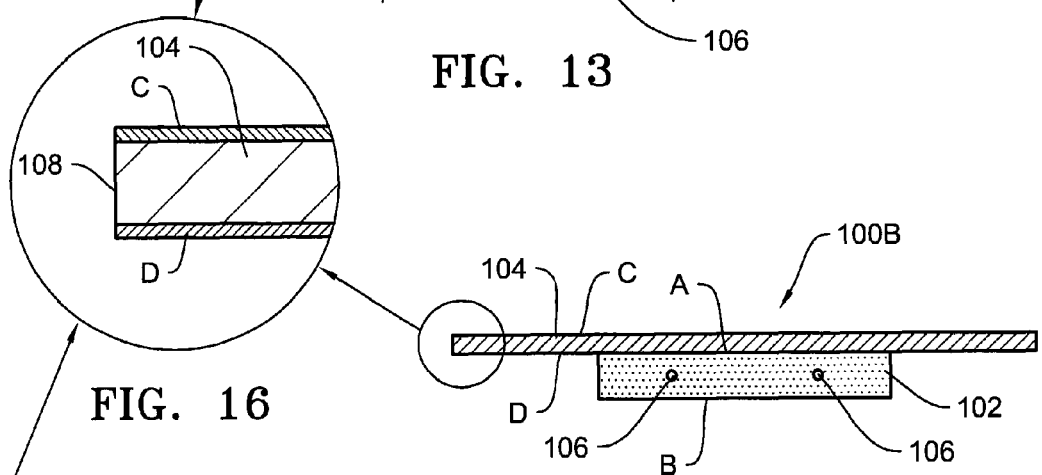
FIG. 16
FIG. 14
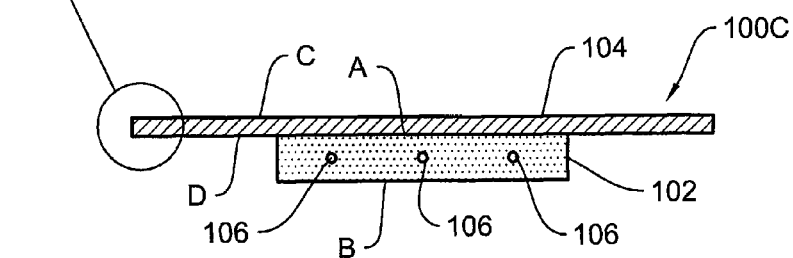
FIG. 15

TRAVERSE WOUND DOUBLE-SIDED PRESSURE SENSITIVE ADHESIVE TAPE

BACKGROUND

Double-sided pressure sensitive adhesive (PSA) tape, as the name implies, is a tape strip with adhesive surface on both sides and is used for bonding or joining items back-to-back. Double-sided PSA tape is well known and is used in a variety of consumer and commercial applications.

As illustrated in FIGS. 1 and 2, conventional double-sided PSA tape 10, comprises an adhesive body 12 having an adhesive upper surface "A" and an adhesive lower surface "B". The tape 10 also includes a removable release liner 14 which serves to protect the upper surface "A" of the adhesive body 12 until the release liner 14 is removed prior to use. As best illustrated in FIG. 2A, the release liner 14 has a top release coating "C" and a bottom release coating "D" with the edges 22 of the release liner 14 being uncoated. The top and bottom release coatings C, D typically have different release values (discussed later).

Conventionally, double-sided PSA tape 10 is distributed as a disk 16 (also referred to as "pancakes") in which the PSA tape strip is spiral wound around a core 18 (approximately the same width as the release liner 14), with the lower adhesive surface B of each successive spiral winding overlying the release liner 14 of the previous spiral winding, thereby producing a spiral wound "disk" or "pancake" with the release liner 14 acting as a separator between each spiral layer. In use, the disk 16 is rotatably supported on a shaft extending through the core 18 permitting the disk 16 to rotate as the tape 10 is unwound as it is being applied to the intended article. As the tape 10 is unwound, the release liner 14 remains adhered to the upper surface A of the adhesive body 12 for protection of the adhesive until the release line 14 is purposefully removed prior to use.

To ensure that the release liner 14 remains adhered to the upper surface A of the adhesive body during the unwinding process, the bottom release coating D of the release liner 14 typically has a higher release value (i.e., a "tighter release") than the top release coating C having a lower release value (i.e., an "easier release"). Thus, when the tape 10 is pulled to unwind it from the disk 16, the lower surface B of the adhesive body 12 will readily pull away from the "easier release" top release coating C of the release liner 14 of the previous spiral winding, while the upper surface A of the adhesive body 12 remains adhered to the "tighter release" bottom release coating D of the release liner 14.

It should be appreciated that for commercial applications, the diameter of the spiral wound disks 16 can be quite large because the commercial user desires the maximum lineal feet of tape 10 on each disk to minimize downtime associated with swapping out spent or used disks with new disks.

Others have attempted to produce traverse wound spools of double-sided PSA tape because it is well recognized that a spool of traverse wound tape will provide more continuous linear feet of tape than is feasible with a spiral wound disk. FIG. 3 illustrates a traverse wound spool 20 of double-sided PSA tape. It should be appreciated that with any traverse wound spool of double-sided PSA tape, the outer winding layer of tape will cross over the previously wound inner winding layer at an oblique angle.

FIGS. 4-7 (discussed separately below) illustrate different prior art cross-sectional embodiments of the PSA tape 10A, 10B, 10C, 10D which others have attempted to use to produce traverse wound spools. As explained in more detail below, the PSA tape embodiment 10A can result in catastrophic failures during the unwinding process and therefore is not a suitable solution and while the embodiments of the PSA tape 10B, 10C and 10D may serve the intended purpose, they are costly to produce.

FIG. 4 illustrates a cross-section of one embodiment of an unreinforced double-sided PSA tape 10A as viewed along lines 4-5 of FIG. 3. Referring to FIG. 8, which is intended to represent a partial cross-sectional view of the spool 20 as viewed along line 8-8 of FIG. 3, it should be appreciated that the unreinforced adhesive body 12 of the outer winding layer L2 will come into contact with and bond to the uncoated edges 22 of the release liner 14 of the inner winding layer L1 resulting in "Edge Bonding". As illustrated in FIG. 8A, when unwinding the outer winding layer L2 from the inner winding layer L1, because the adhesive body 12 is unreinforced, if the strength of the Edge Bonding is greater than the release value of the bottom release coating D of the release liner 14, the adhesive body 12 of the outer winding layer L2 will begin to pull away from the release liner 14 of the outer winding layer L2. Eventually, as the tape 10A continues to unwind, the unreinforced adhesive body 12 will eventually completely separate from the release liner 14 as shown in FIG. 8B. At some point, the unreinforced adhesive body 12 will eventually tear causing the severed adhesive body 12 to remain behind as the release liner 14 continues to unwind resulting in a catastrophic failure of the unwinding process. If such a catastrophic failure occurs, the unwinding process has to be stopped, the tape cut, and the spool must typically be discarded as unusable resulting in lost productivity and loss of part of the tape spool.

FIG. 5 illustrates a cross-section of another embodiment of double-sided PSA tape 10B as viewed along lines 5-5 of FIG. 3. In this embodiment, the tape 10B includes a "scrim" layer 24 disposed in the middle of the adhesive body 12. The scrim layer 24 may comprise a thin plastic film, paper or non-woven material. To produce the double-sided PSA tape 10B having a scrim layer 24, a first adhesive layer is applied onto a wide disposable release liner across its full width. A wide scrim layer 24 is then applied over the top surface of the first adhesive layer. A second layer of adhesive 28 is then applied across the full width of the scrim layer 24. The multi-layered adhesive body is then slit into the desired finished adhesive width, and the top release liner 24 is then applied onto the top surface of the second adhesive layer. The disposable release liner is then removed leaving the scrim reinforced adhesive body 12 with the top release liner 14 as illustrated in FIG. 5. Referring to FIG. 9, which is intended to represent a partial cross-sectional view of the spool 20 as viewed along line 9-9 of FIG. 3, it should be appreciated that the lower or first adhesive layer 26 of the outer winding layer L2 will still come into contact with and bond to the uncoated edges 22 of the release liner 14 of the inner winding layer L1 resulting in Edge Bonding. However, the scrim layer 24 serves to reinforce the adhesive body prevent the type of catastrophic failure described above which may occur with unreinforced adhesive bodies. However, as explained above, the addition of a scrim layer 24 requires a multi-step process for producing the tape thereby significantly increases the cost of manufacturing the tape.

FIG. 6 illustrates a cross-section of another embodiment of double-sided PSA tape 10C as viewed along lines 6-6 of FIG. 3. This embodiment is disclosed in JP63199147 and is substantially the same as the tape embodiment 10B of FIGS. 5 and 9, except that the scrim layer 24 is significantly wider than the adhesive body 12. Referring to FIG. 10, which is intended to represent a partial cross-sectional view of the spool 20 as viewed along line 10-10 of FIG. 3, it should be appreciated that the lower or first adhesive layer 26 of the outer winding layer L2 will still come into contact with and bond to the uncoated edges 22 of the release liner 14 of the inner winding layer L1 resulting in Edge Bonding. But, like the previously described embodiment, the wide scrim layer 24 serves to reinforce the adhesive body 12 to prevent the type of catastrophic failures that can occur with the unreinforced adhesive tape 10A. However, this embodiment suffers from the same high cost and complexity of production as the previously described tape embodiment 10B.

One attempt to overcome the problem of Edge Bonding when traverse winding PSA tape is disclosed in U.S. Patent Publication No. US2010/0119803 to Kosaka et al. (the "Kosaka Publication"). In the Kosaka Publication, as illustrated in FIG. 7, the double-sided adhesive tape 10D includes a second release liner 30 adhered to the lower adhesive surface B of the adhesive body 12. FIG. 11 is a partial cross-sectional view of the tape 10D as viewed along line 11-11 of FIG. 3. It should be appreciated that the bottom release liner 30 substantially prevents Edge Bonding from occurring because the adhesive body does not come into contact with the uncoated edges of the release liner. While the use of a second release liner 30 over the lower adhesive surface B may avoid the problems associated with Edge Bonding, such a solution significantly increases the cost of production in the same manner as the tape embodiments 10B and 10C. For example, to produce the tape 10D having a bottom release liner 30, the bottom release liner 30 is first laid down. A hot-melt adhesive (or other desired adhesive) is deposited onto the upper surface of the bottom release liner 30. The wide upper release liner 14 is then placed onto the top surface of the adhesive body 12. Once the adhesive body is suitably cured, it is then traverse wound onto the core 18 to form the spool 20 as shown in FIG. 3. However, it should be appreciated that before the PSA tape 10D can be applied to an item, the bottom release liner 30 must be removed to expose the bottom surface B of the adhesive body 12. Accordingly, the user must modify its process and equipment used to apply the tape in order to remove and wind the bottom release liner 30 as part of the unwinding process in order to expose the bottom surface B of the adhesive body 12 prior to applying the tape 10D to the item. Accordingly, with the additional material costs of the bottom release liner and the additional steps associated with removal of the bottom release liner prior to use, the tape 10D is not a suitable solution.

Accordingly, there remains a long felt but unresolved need for a more economical solution for producing a transverse wound double-sided PSA tape which overcomes the problems associated with the prior art due to Edge Bonding of unreinforced adhesive bodies but which is more economical to produce than current methods of producing reinforced adhesive bodies.

BRIEF DESCRIPTION OF THE DRAWINGS

FIG. 1 is a perspective view of conventional prior art double-sided PSA tape spiral wound into a disk roll.

FIG. 2 is a cross-section view of the double-sided PSA tape as viewed along lines 2-2 of FIG. 1.

FIG. 2A is an enlarged view of the circled edge portion of the release liner of FIG. 2.

FIG. 13 is a cross-sectional view of an embodiment of the double-sided PSA tape 100A having a single reinforcing strand as viewed along line 13-13 of FIG. 12.

FIG. 14 is a cross-sectional view of another embodiment of the double-sided PSA tape 100B with two reinforcing strands as viewed along line 14-14 of FIG. 12.

FIG. 15 is a cross-sectional view of another embodiment of the double-sided PSA tape 100C with three reinforcing strands as viewed along line 15-15 of FIG. 12.

FIG. 16 is an enlarged view of the circled edge portion of the release liner of FIGS. 13, 14 and 15.

DESCRIPTION

Figure 12:
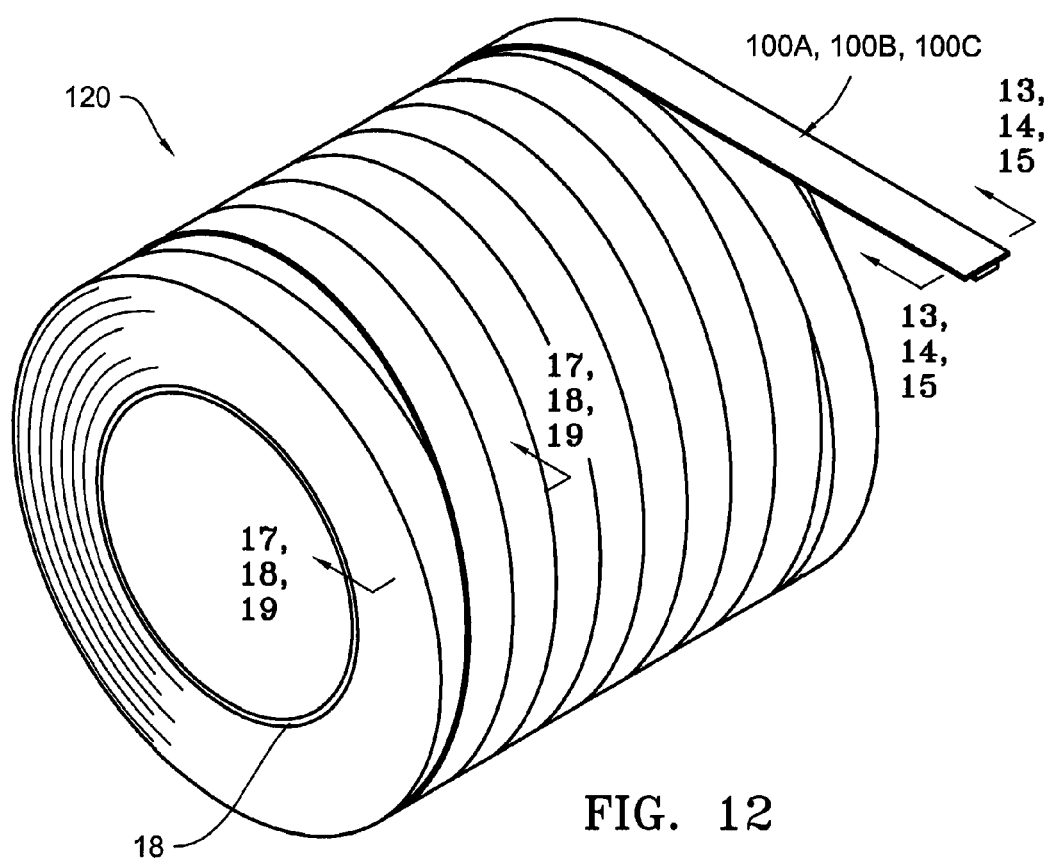
FIG. 12 is a perspective view of an embodiment of traverse wound spool of double-sided PSA tape 100.

Referring to the drawings wherein like reference numerals designate the same or corresponding elements throughout the several views, FIG. 12 illustrates an embodiment of a spool 120 of double-sided pressure sensitive adhesive ("PSA") tape 100 traverse wound around a core 18. As illustrated in FIGS. 13-15, which correspond to cross-sectional views of the tape 100, as viewed along respective lines 13-13, 14, 14 and 15-15 of FIG. 12, the tape 100 comprises an adhesive body 102, a release liner 104 and at least one reinforcing strand 106 embedded in the adhesive body 102. FIG. 13, shows an embodiment of the tape 100A with a single reinforcing strand 106. FIG. 14 shows an embodiment of the tape 100B with two reinforcing strands 106, and FIG. 15 shows an embodiment of the tape 100C with three reinforcing strands 106.

In each of the embodiments, the adhesive body 102 has an upper adhesive surface "A" and a lower adhesive surface "B", a width "W1", and a thickness "T". The width W1 may be any suitable or desired width depending on the particular application, but in most applications the width W1 is typically between about 1/16 inch to 3/4 inch (1.6 mm to 19 mm). The thickness T may be any suitable or desired thickness depending on the particular application, but in most applications, the thickness T is typically between about 0.1 to 25 mils (0.002 mm to 0.64 mm).

The adhesive used for the adhesive body 102 may be any suitable or desired PSA. In a preferred embodiment the PSA comprises hot-melt acrylic. Other suitable hot-melt PSAs include, but are not limited to rubber, vinyl alkyl ether, silicon, polyester, polymide, urethane, fluorine-containing and epoxy. Additionally, rather than hot-melt, the PSA may include, but is not limited to emulsion, solvent, and ultra-violet-curable PSA. The adhesive body 102 may comprise a single layer or multiple layers and the adhesive body may contain fillers, pigments and or hollow microspheres.

The release liner 104 has a width "W2" defined by edges 108. The release liner width W2 is at least equal to the width W1 of the adhesive body 102 and is preferably about 1.5 to 2 times the with W1 of the adhesive body 102. As best illustrated in the enlarged view of FIG. 16 (not to scale), the release liner 104 has a top release coating C and a bottom release coating D.

The top release coating C of the release liner 104 has a lower release value (i.e., an "easier release") when compared to the bottom release coating D of the release liner 104 which has a higher release value (i.e., a "tighter release"). In a preferred embodiment, the release ratios between the lower release value of the top release coating C and the higher release value of the bottom release coating D is about 1:3, but other release ratios may be equally suitable depending on various factors recognized by those of skill in the art.

The release liner 104 may be any suitable or desirable release liner depending on the application, but is typically a film substrate with desired release coatings. The release liner preferably has a thickness of about 1 mil (0.025 mm) but may have any desired thickness typically within a range of about 0.3 to 25 mils (0.008 mm to 0.64 mm).

A suitable film substrate may comprise polyester, polypropylene, polyethylene (including high density polyethylene (HDPE), low density polyethylene (LDPE)). Other suitable substrates may include, but are not limited to, styrene, polystyrene, polyvinyl chloride (PVC), biaxially oriented polypropylene (BOPP), cast polypropylene (cPP), metalized-PET, metalized-BOPP, poly-coated paper, and specialty papers or fabrics.

A preferred release coating is silicone, but other suitable coating materials may include, but are not limited to fluoro-phosphate ester, poly-vinyl octadecyl carbamate, and aliphatic polyurethane. Furthermore, it should be appreciated that some film substrates may have a sufficiently low surface energy that a surface coating may not be necessary on one or both sides.

The release liner 104 may also included printed information, including the brand or trademarks or other identifying information, such as release values, etc.

It should be appreciated that the outside diameter of the core 18 is coated with silicone or other suitable release coating as identified above so the lower surface B of the adhesive body 102 of the first layer L1 on the core 18 is releasable or removable from the core 18 just as readily as the double-sided PSA tape is releasable from the top release coating C of the release liner 104 of a previous wound layer on the spool 120.

The reinforcing strands 106 may comprise any suitable material. The number and type of reinforcing strands 106 may depending on various factors, including the width of the adhesive body, the tensile strength needed to overcome the edge bond with the underlying traverse windings (discussed below), desired safety factors, cost, availability, and ease of handling of the strands. Polyester filament yarn having a fiber density of 110 decitex has been found to be suitable for the reinforcing strands 106 because it is readily available, low in cost and is easy to handle in the production environment. Rather than polyester filament yarn, other filament yarn materials such as polypropylene, nylon and other synthetic or natural materials, may be equally suitable and different decitex or denier ranges may be equally suitable. Additionally, rather than filament yarn, a monofilament may be suitable.

Testing has shown that a minimum safety factor of three is typically adequate when selecting the tensile strength of the reinforcing strand 106. Higher or lower safety factors may also be suitable depending on the application.

As illustrated in FIGS. 3, 17, 18 and 19, the double-sided PSA tape 100 is traverse wound around a core 18 to produce a spool 120 having multiple layers or windings L1, L2 . . . Ln, with each successively wound layer being traverse wound over the release liner 104 of the preceding wound layer. The number of wound layers L1-Ln may vary depending on the linear feet of tape 100 desired on the core 18, the length of the core 18, the desired diameter of the traverse wound spool 120, the density or spacing of the windings, and the thickness of the tape 100.

As an example, 20,000 linear feet of double-sided PSA tape traverse wound onto a spool has been produced with the following properties:

Adhesive body width (W1)=¼ inch (6 mm)
Adhesive body thickness (T)=1.6 mils (0.04 mm)
Adhesive material=hot melt acrylic
Reinforcing Strand=single polyester filament yarn, 110 decitex, 48 filaments
Release liner width (W2)=½ inch (13 mm)
Release liner thickness=1 mil (0.02 mm)
Release liner material=silicone coated polyester
Traverse winding density or spacing=¼ inch (6 mm)
Core length=7 inches (17.8 cm)
Core outside diameter=6.5 inch (16.5 cm)
Tape length=20,000 feet (6,096 m)
Finished spool outside diameter=10 inches (25.4 cm)

Figure 17:
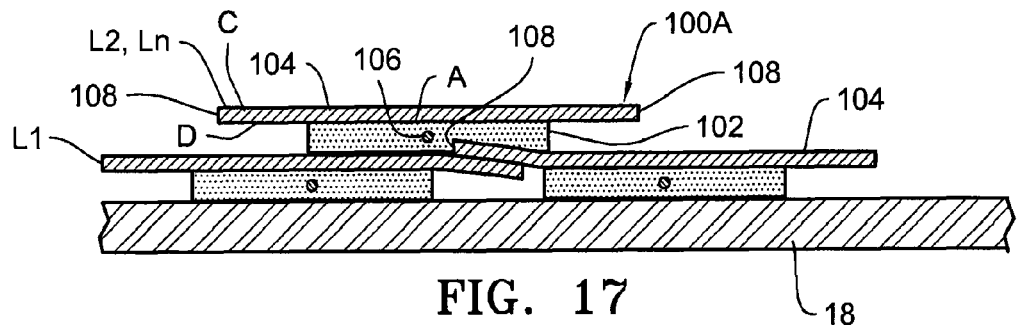
FIG. 17 is a partial cross-sectional view of the traverse wound PSA tape spool with the PSA tape embodiment 100A as viewed along line 17-17 of FIG. 12.
Figure 18:
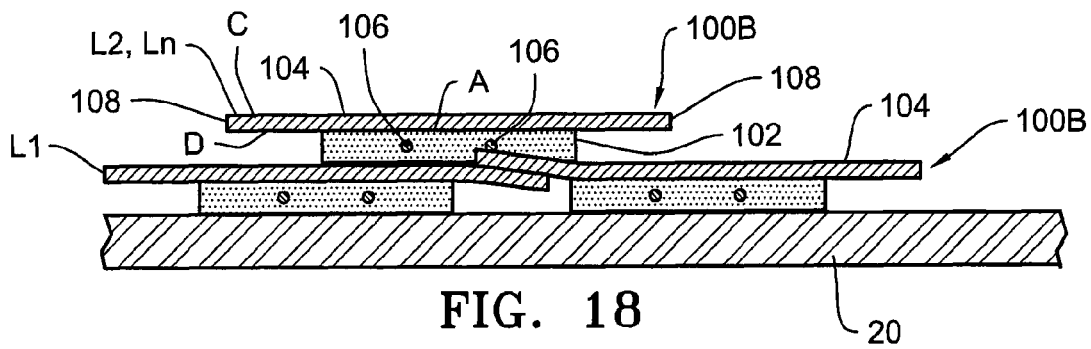
FIG. 18 is a partial cross-sectional view of the traverse wound PSA tape spool with the PSA tape embodiment 100B as viewed along line 18-18 of FIG. 12.
Figure 19:
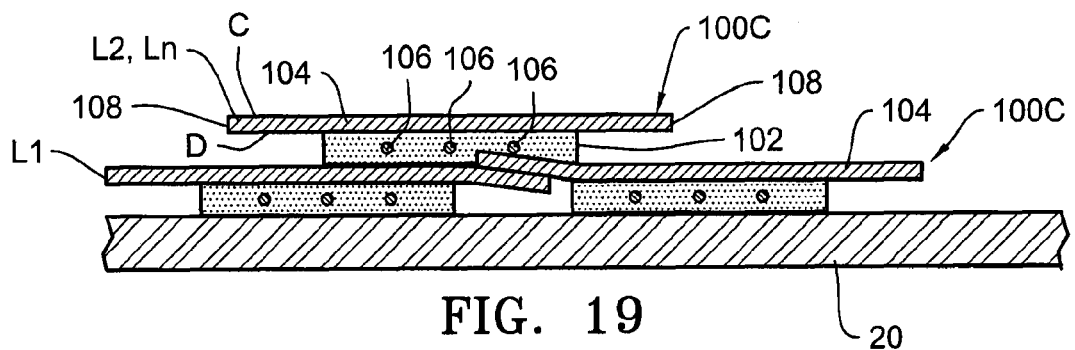
FIG. 19 is a partial cross-sectional view of the traverse wound PSA tape spool with the PSA tape embodiment 100C as viewed along line 19-19 of FIG. 12.

Referring to FIGS. 17, 18, and 19, when traverse winding the double-sided PSA tape 100, the lower adhesive surface B of the outer winding layers Ln will cross over the top side of the release liner 104 of the inner winding layers Ln−1 at an oblique angle such that the adhesive body 102 of the outer winding layer will come into contact with and bond to the uncoated edges 108 of the release liner 104 of the inner winding layer resulting in "Edge Bonding". In addition, to Edge Bonding, there will also be some bonding of the lower adhesive surface B of the outer winding layer Ln to the top surface of the inner winding layer Ln−1 corresponding to the release value of the top release coating (referred to as the "Top Bond"). It is preferred that the tensile strength of the strand 106 is greater than the combined strength of the Edge Bonding and the Top Bond (collectively, the "Resistance Bond") by a factor of about 3 or more. Additionally, it should be appreciated that the release value between the upper surface A of the adhesive body and bottom side D of the release liner 104 should be greater than the Resistance Bond so as to prevent the release liner 104 of the inner winding layer from being pulled away from the adhesive body 102 of the inner winding layer as the outer winding layer is unwound from the spool.

Figure 5:
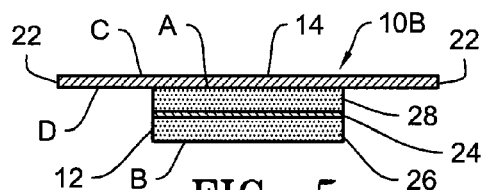
FIG. 5 is a cross-section view of another prior art embodiment of a double-sided PSA tape, as viewed along line 5-5 of FIG. 3.
Figure 6:
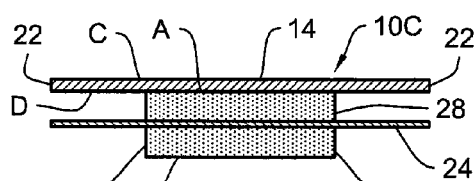
FIG. 6 is a cross-section view of another prior art embodiment of a double-sided PSA tape, as viewed along line 6-6 of FIG. 3.
Figure 7:
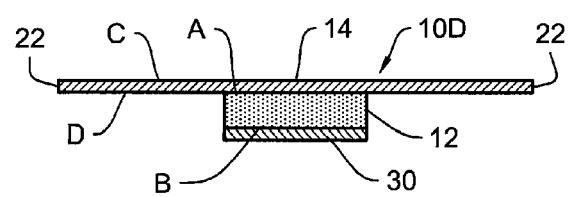
FIG. 7 is a cross-section view of another prior art embodiment 10D of a double-sided PSA tape, as viewed along line 7-7 of FIG. 3.

Testing of the traverse wound spool referenced above identified that the required strength to overcome the Resistance Bond resulting from the transverse winding had an average kinetic peak force of 0.123 lbs (0.056 kg) after seven days of aging. The 110 decitex yarn had a tensile strength of 0.93 lbs (0.42 kg) resulting in a safety factor of 7.5, which is well above the preferred safety factor of 3. It has been found that the foregoing traverse wound spool resulted in a cost reduction of 30% to 40% when compared to producing 20,000 linear feet of double-sided PSA tape in disks. Similar cost reductions of 30% to 40% have also been found with producing spools of strand reinforced traverse wound double-sided PSA tape 100 compared to producing spools of scrim film reinforced traverse wound double-sided PSA tape (such as embodiments 10B and 10C shown in FIGS. 5 and 6) due to the higher cost of the scrim film 24 in relation to the lower cost strands 106 and due to the multi-step or multi-coating processes required to produce the scrim-film reinforced PSA tape 10B and 10C.

Figure 3:
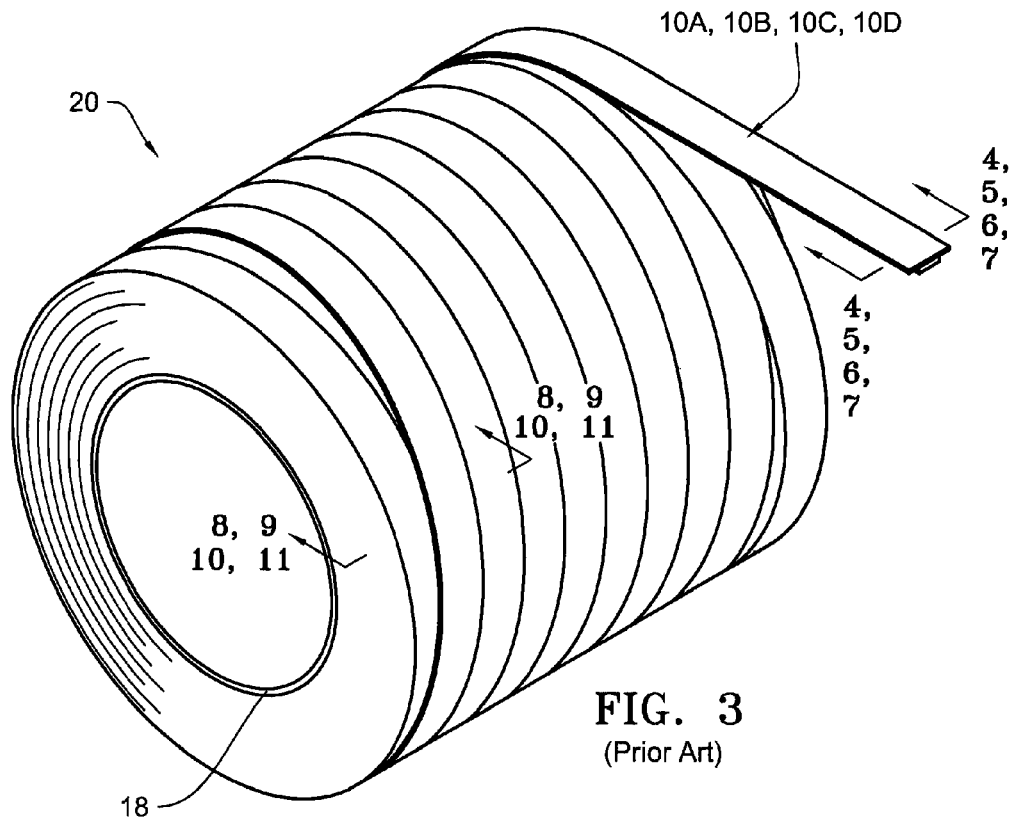
FIG. 3 is a perspective view of a traverse wound spool of prior art double-sided PSA tape embodiments (10A, 10B, 10C and 10D).
Figure 4:
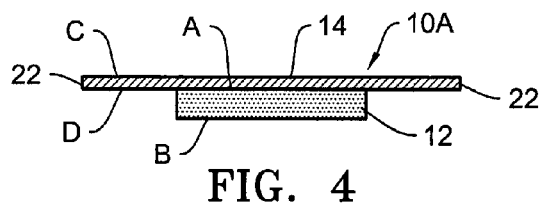
FIG. 4 is a cross-section view of a prior art embodiment of a double-sided PSA tape 10A (which is substantially the same as FIG. 2), as viewed along line 4-4 of FIG. 3
Figure 8:
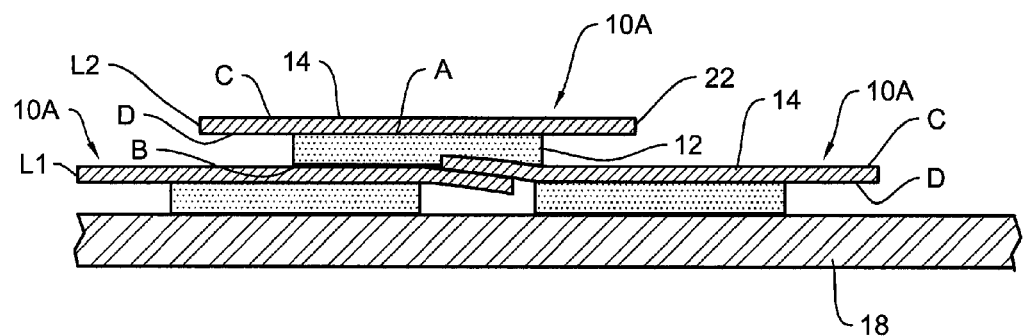
FIG. 8 is a partial cross-sectional view of the prior art traverse wound PSA tape spool with the prior art tape 10A as viewed along line 8-8 of FIG. 3.
Figure 8A:
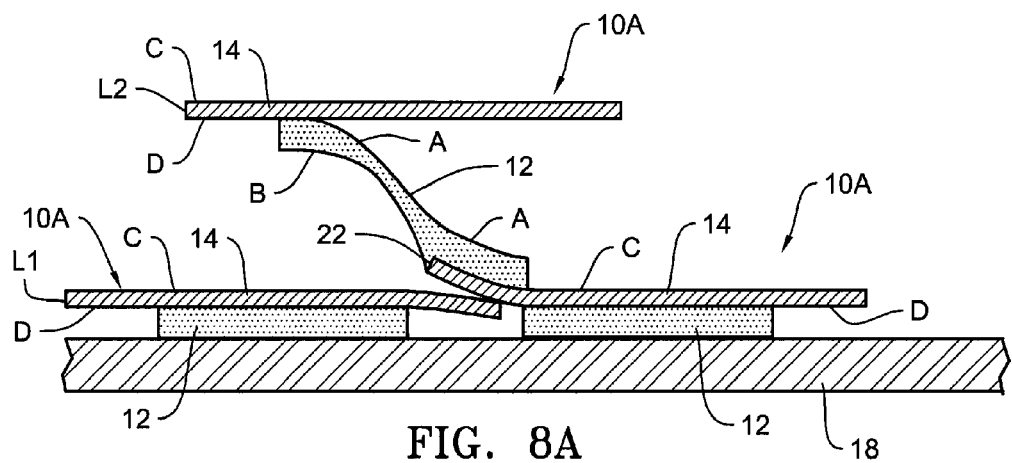
FIG. 8A shows the prior art tape embodiment 10A being unwound from the spool and illustrating the strength of the Edge Bonding being greater than the release value of the release liner resulting in the adhesive body of the outer winding layer being pulled from the release liner.
Figure 8B:
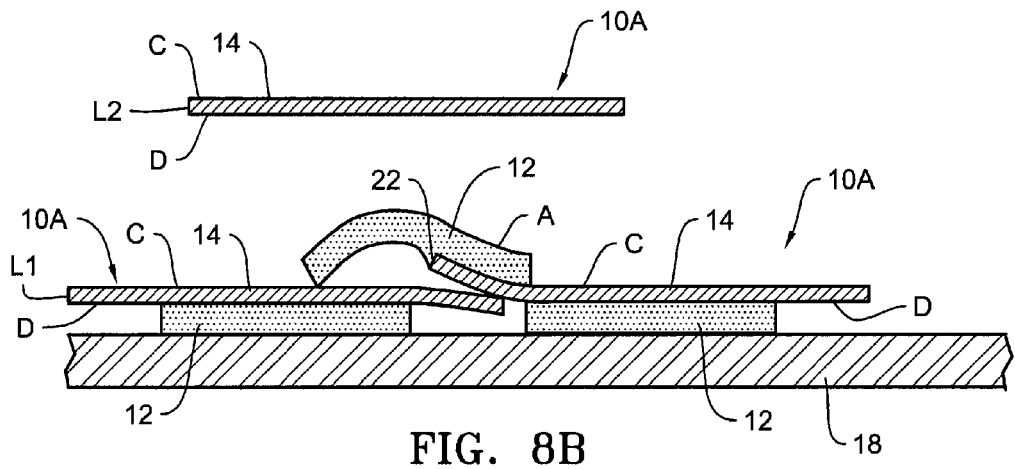
FIG. 8B shows the prior art tape embodiment 10A being unwound from the spool and illustrating the adhesive body separated from the release liner of the of the outer winding layer.
Figure 9:
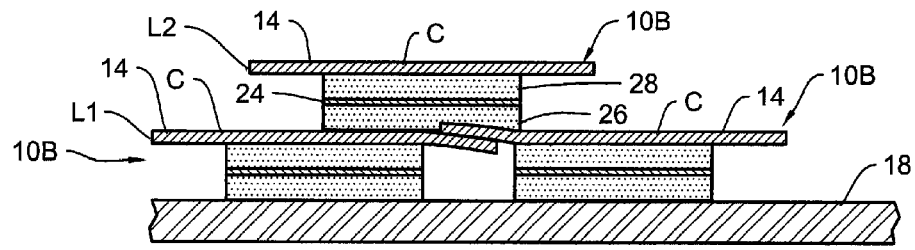
FIG. 9 is a partial cross-sectional view of the prior art traverse wound PSA tape spool with the prior art tape 10B as viewed along line 9-9 of FIG. 3.
Figure 10:
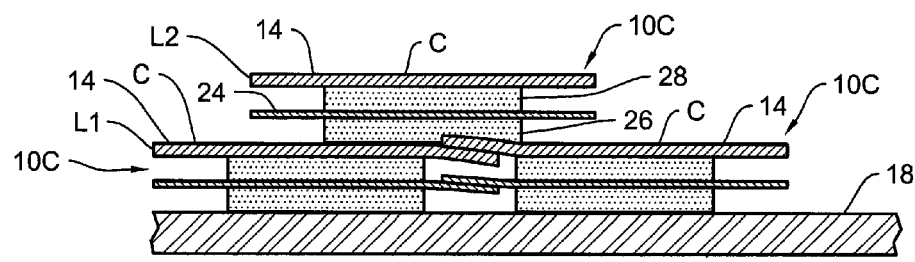
FIG. 10 is a partial cross-sectional view of the prior art traverse wound PSA tape spool with the prior art tape 10C as viewed along line 10-10 of FIG. 3.
Figure 11:
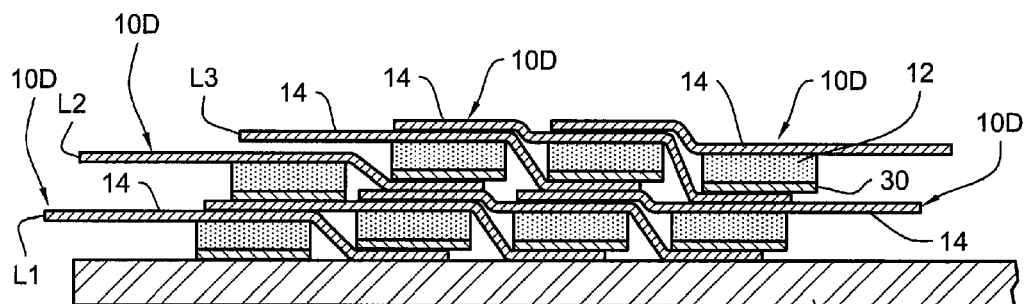
FIG. 11 is a partial cross-sectional view of the prior art traverse wound PSA tape spool with the prior art tape 10D as viewed along line 11-11 of FIG. 3.
Figure 17A:
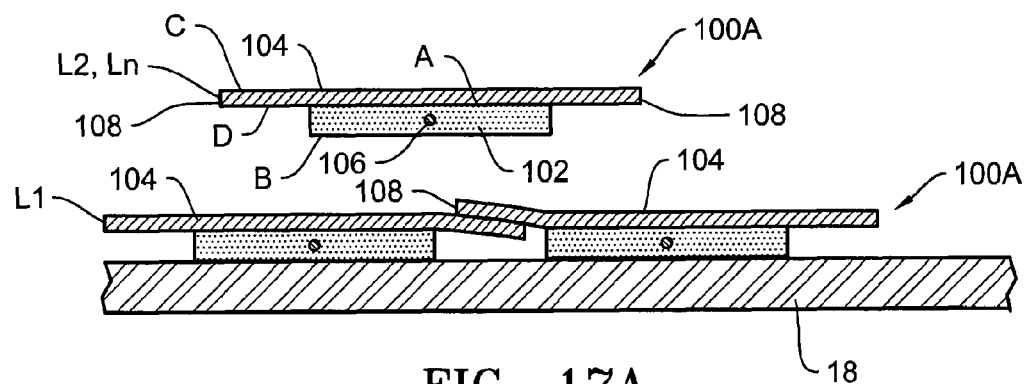
FIG. 17A shows the single reinforcing strand tape PSA tape 100A being unwound from the spool and illustrating the tensile strength of the reinforcing strand overcoming the Edge Bonding such that the adhesive body is not pulled away from the release liner.
Figure 17B:
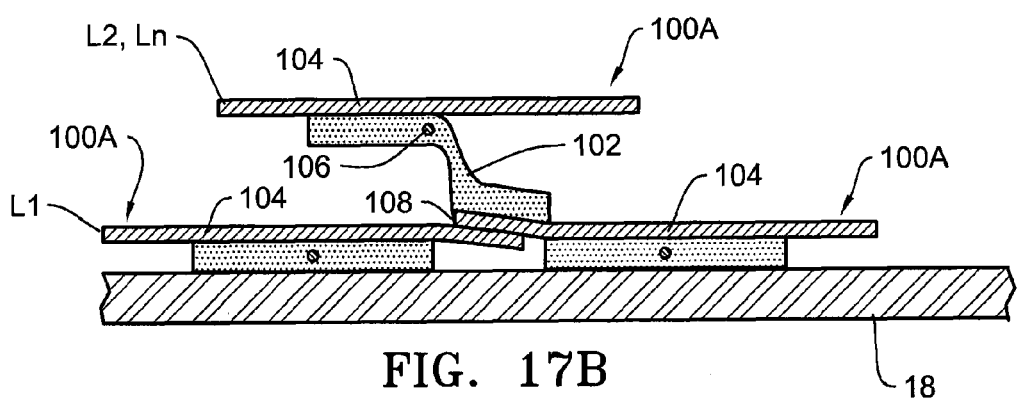
FIG. 17B-17C shows the single reinforcing strand PSA tape 100A being unwound from the spool and illustrating the strength of the Edge Bonding being greater than the internal strength of the adhesive body resulting in tearing of the adhesive body, but illustrating that the adhesive body will not tear past the single reinforcing strand, such that a majority of the adhesive body will remain adhered to the release liner of the outer winding layer.
Figure 17C:
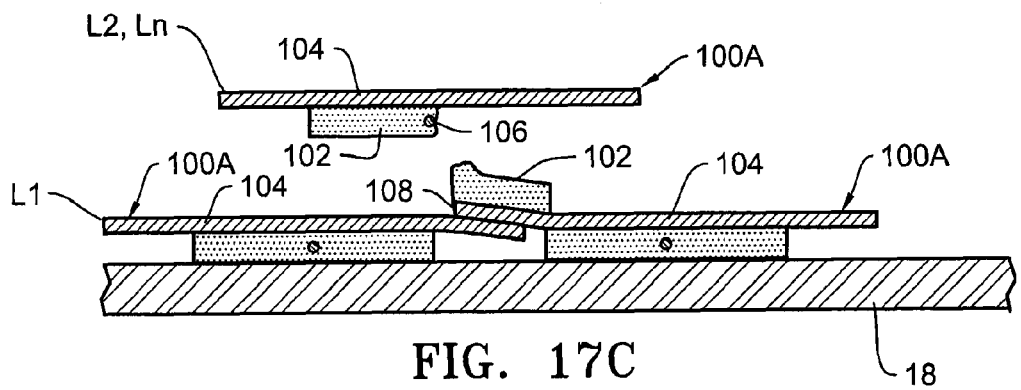

FIG. 17 represents a partial cross-sectional view of the traverse wound PSA tape spool 120 as viewed along line 17-17 of FIG. 12 with the PSA tape embodiment 100A having a single reinforcing strand 106. FIG. 17A represents the outer winding layer L2 (or Ln as the case may be) of PSA tape 100A being unwound from the inner winding layers L1 (or Ln−1 as the case may be) of the spool 120. It should be appreciated that as the outer winding layer L2 is being pulled from the spool 120 during the unwinding process, the outer winding layer L2 is subject to longitudinal strain or tensile stress. The reinforcing stand 106, reduces the internal stain on the adhesive body 102 thereby minimizing stretching and tearing of the adhesive body and release liner during the unwinding process. In the event that Edge Bonding occurs as illustrated in FIG. 17B, the strain on the adhesive body 102 to the left of the reinforcing strand 106 (as viewed in FIG. 17B) is minimized because substantially all of the tensile strain is resisted by the reinforcing strand 106. As such, if the internal strength of the adhesive body 102 to the right of the reinforcing strand 106 (as viewed in FIG. 17B) is greater than the strength of the Edge Bonding, the adhesive body 102 will pull free from the Edge Bonding of the inner winding layer L1 such as represented in FIG. 17A. However, as illustrated in FIG. 17C, if strength of the Edge Bonding is greater than the internal strength of the adhesive body 102 to the right of the reinforcing strand 106 (as viewed in FIG. 17C), the adhesive body will begin to tear at an oblique angle as the outer winding layer L2 pulls away from the inner winding layer L1 until the tear reaches the reinforcing strand 106. The reinforcing strand 106 prevents the adhesive body from tearing laterally past (i.e., to the left) of the reinforcing strand 106, thereby ensuring that a majority of the adhesive body 102 will remain adhered to the release liner 104 of the outer winding layer L2. Additionally, it should also be appreciated that because the outer winding layer crosses at an oblique angle to the inner winding layer, the amount of adhesive torn away to the right of the reinforcing strand 106, will eventually decrease and stop as the outer winding layer continues to be unwound, such that there will be, at most, only intermittent sections with portions of the adhesive body torn away due to Edge Bonding. Without the reinforcing strand 106, such as the prior art embodiments of FIG. 4, the adhesive body would completely pull away from the release liner (as shown in FIGS. 8A-8B) causing a complete failure of the tape application process, requiring line stoppage contributing to lost productivity, and loss of part of the tape spool as explained above.

Figure 18A:
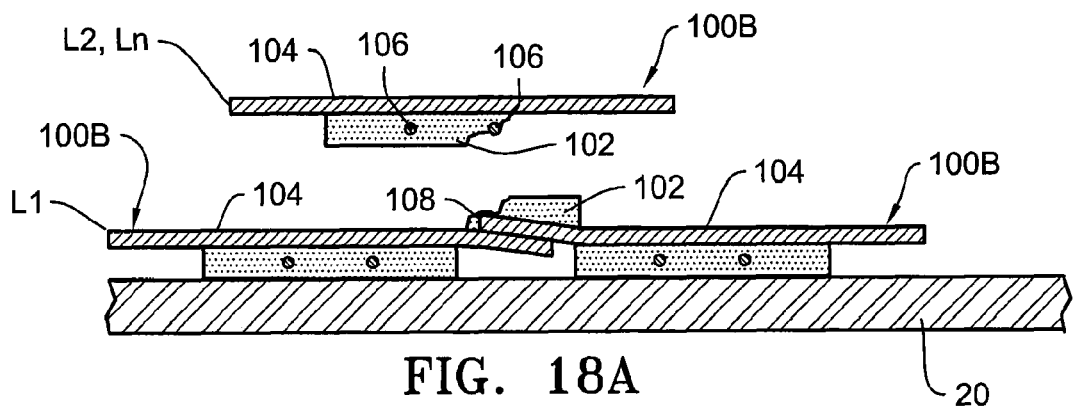
FIG. 18A shows the two reinforcing strand PSA tape 100B being unwound from the spool and illustrating the strength of the Edge Bonding being greater than the internal strength of the adhesive body resulting in tearing of the adhesive body, but illustrating that the adhesive body will not tear beyond the two reinforcing strands, such that a substantial portion of the adhesive body will remain adhered to the release liner of the outer winding layer.

FIG. 18 represents a partial cross-sectional view of the traverse wound PSA tape spool 120 as viewed along line 18-18 of FIG. 12 with the PSA tape embodiment 100B having two reinforcing strands 106. FIG. 18A represents the outer winding layer L2 (or Ln as the case may be) of PSA tape 100B being unwound from the inner winding layers L1 (or Ln−1 as the case may be) of the spool 120. It should be appreciated that as in the previous described embodiment in connection with FIG. 17, as the outer winding layer L2 is being pulled from the spool 120 during the unwinding process, the outer winding layer L2 is subject to longitudinal strain or tensile stress. The reinforcing stands 106, reduce the internal stain on the adhesive body 102 thereby minimizing stretching and tearing of the adhesive body and release liner during the unwinding process. In the event that Edge Bonding occurs, the strain on the adhesive body 102 is minimized because substantially all of the tensile strain is resisted by the reinforcing strands 106. As such, if the internal strength of the adhesive body 102 is greater than the strength of the Edge Bonding, the adhesive body 102 will pull free from the Edge Bonding of the inner winding layer L1. However, as illustrated in FIG. 18A, if strength of the Edge Bonding is greater than the internal strength of the adhesive body 102, only the portion of the adhesive body substantially to the right (as viewed in FIG. 18A) of the right-most reinforcing strand will tear away, thereby ensuring that substantially two-thirds or more of the adhesive body 102 will remain adhered to the release liner 104 of the outer winding layer L2. Additionally, it should also be appreciated that because the outer winding layer crosses at an oblique angle to the inner winding layer, the amount of adhesive torn away to the right-most reinforcing strand 106, will eventually decrease as the outer winding layer continues to be unwound, such that there will be, at most, only intermittent sections with portions of the adhesive body torn away due to Edge Bonding. Without the reinforcing strands 106, such as the prior art embodiments of FIG. 4, the adhesive body would completely pull away from the release liner (as shown in FIGS. 8A-8B) causing a complete failure of the tape application process, requiring line stoppage contributing to lost productivity, and loss of part of the tape spool as explained above.

Figure 19A:
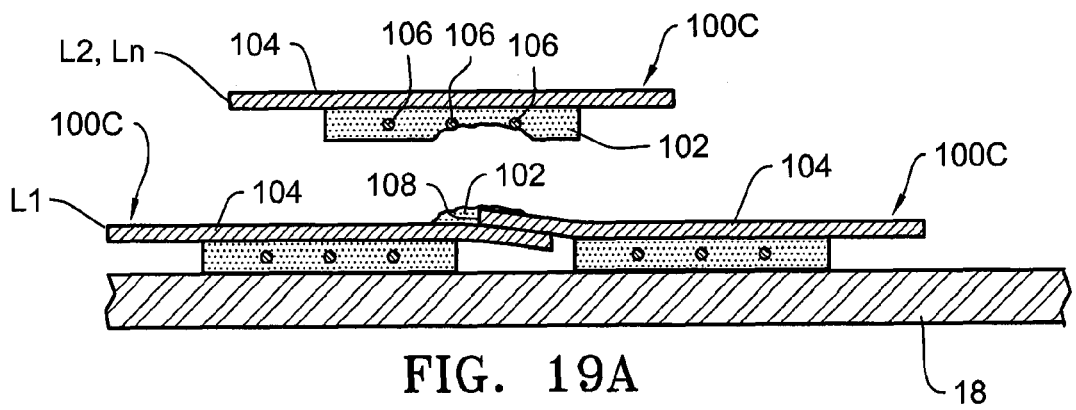
FIG. 19A shows the three reinforcing strand PSA tape 100C being unwound from the spool and illustrating the strength of the Edge Bonding being greater than the internal strength of the adhesive body resulting in tearing of the adhesive body, but illustrating that only a small portion of the adhesive body will tear below the two closest reinforcing strands, such that substantially the entire adhesive body will remain adhered to the release liner of the outer winding layer.

FIG. 19 represents a partial cross-sectional view of the traverse wound PSA tape spool 120 as viewed along line 19-19 of FIG. 12 with the PSA tape embodiment 100C having three reinforcing strands 106. FIG. 19A represents the outer winding layer L2 (or Ln as the case may be) of PSA tape 100C being unwound from the inner winding layers L1 (or Ln−1 as the case may be) of the spool 120. It should be appreciated that as in the previous described embodiments in connection with FIGS. 17 and 18, as the outer winding layer L2 is being pulled from the spool 120 during the unwinding process, the outer winding layer L2 is subject to longitudinal strain or tensile stress. The reinforcing stands 106, reduce the internal stain on the adhesive body 102 thereby minimizing stretching and tearing of the adhesive body and release liner during the unwinding process. In the event that Edge Bonding occurs, the strain on the adhesive body 102 is minimized because substantially all of the tensile strain is resisted by the reinforcing strands 106. As such, if the internal strength of the adhesive body 102 is greater than the strength of the Edge Bonding, the adhesive body 102 will pull free from the Edge Bonding of the inner winding layer L1. However, as illustrated in FIG. 19A, if strength of the Edge Bonding is greater than the internal strength of the adhesive body 102, only the portion of the adhesive body between the reinforcing strands and possibly a small portion to the right and left (as viewed in FIG. 19A) of the two reinforcing strands adjacent the point of Edge Boding will tear away, thereby ensuring that substantially the entire adhesive body 102 will remain adhered to the release liner 104 of the outer winding layer L2. Additionally, it should also be appreciated that because the outer winding layer crosses at an oblique angle to the inner winding layer, the amount of adhesive torn away will eventually decrease as the outer winding layer continues to be unwound, such that there will be, at most, only intermittent sections with portions of the adhesive body torn away due to Edge Bonding. Without the reinforcing strand, such as the prior art embodiments of FIG. 4, the adhesive body would completely pull away from the release liner (as shown in FIGS. 8A-8B) causing a complete failure of the tape application process, requiring line stoppage contributing to lost productivity, and loss of part of the tape spool as explained above.

Figure 20:
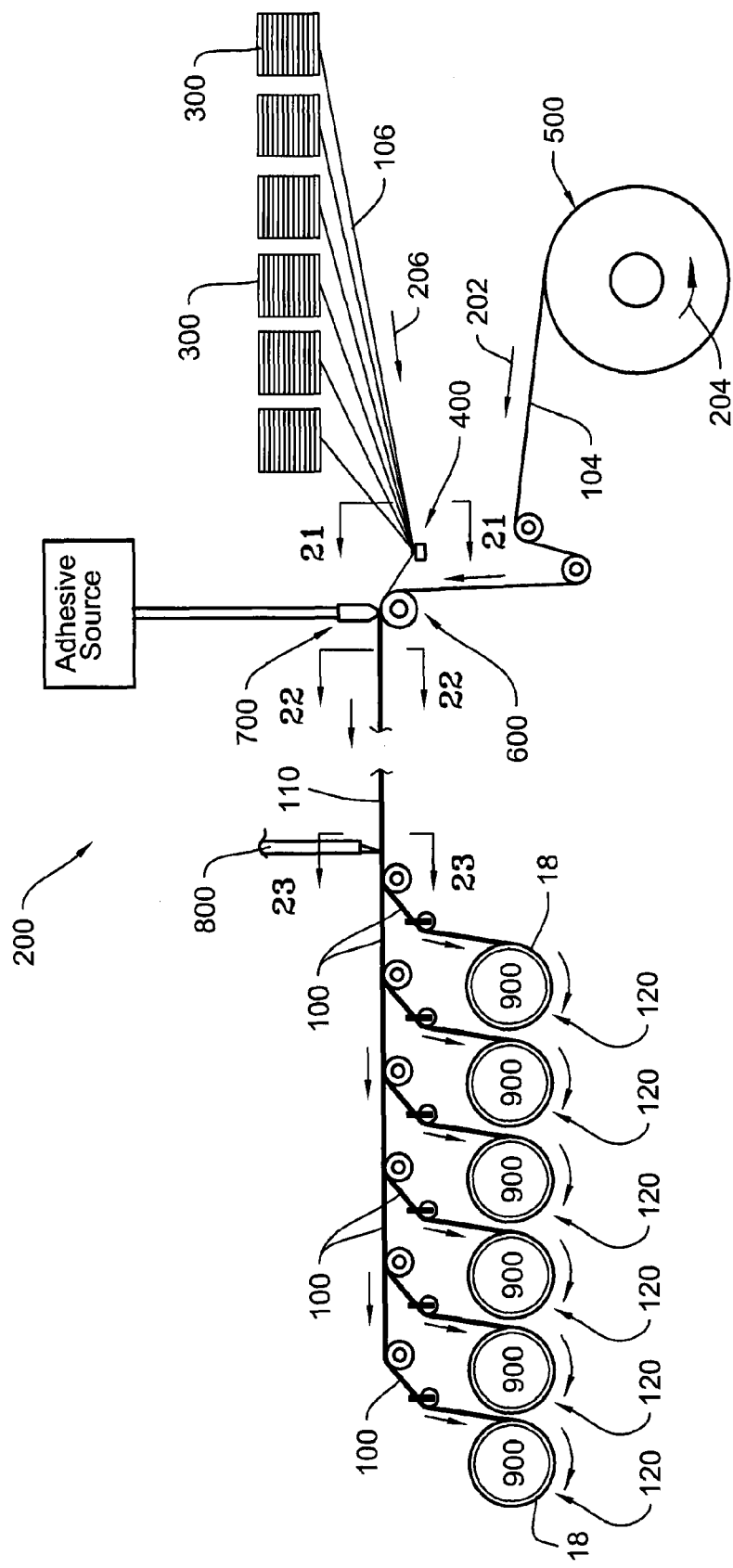
FIG. 20 schematically illustrates a process for producing the double-sided PSA tape embodiment 100A with a single reinforcing strand.

FIG. 20 schematically illustrates an embodiment of a system 200 for simultaneously producing six spools of traverse wound strand reinforced double-sided PSA tape 100. As shown, the system 200 includes six reinforcing strand spools 300, a strand guide 400, a release liner roll 500, a drive wheel 600 coupled to a drive motor (not shown), an adhesive dispensing head 700, a tape slitter 800, and six traverse winders 900. It should be appreciated that the system 200 may be adapted to produce a single spool or any other number of spools as desired. Of course it should be appreciated that if only one spool is being produced at a time, the tape slitter 800 may not be needed.

In operation, the release liner 104 from the release liner roll 500 is directed over the drive wheel 600 and a series of idler rollers as needed to maintain the desired tension on the release liner 104. As the drive wheel 600 rotates, it draws the release liner 104 forward through the system 200 as indicated by the arrows 202 causing the release liner 104 to unwind from the release liner roll 500 as the release liner spool rotates in the direction of the arrow 204. Additionally, as the drive wheel 600 rotates, it draws the reinforcing strands 106 forward through the system 200 along with the release liner 104 as indicated by arrows 206 causing the strands 106 to unwind from the spools 300. As illustrated in FIG. 20, the six reinforcing strands 106 from the six reinforcing strand spools 300 are directed through grommets or rings 402 of the strand guide 400 to properly position the strands 106 over the release liner 104 and in alignment with the six rows of adhesive to be dispensed by the adhesive head 700.

Figure 21:
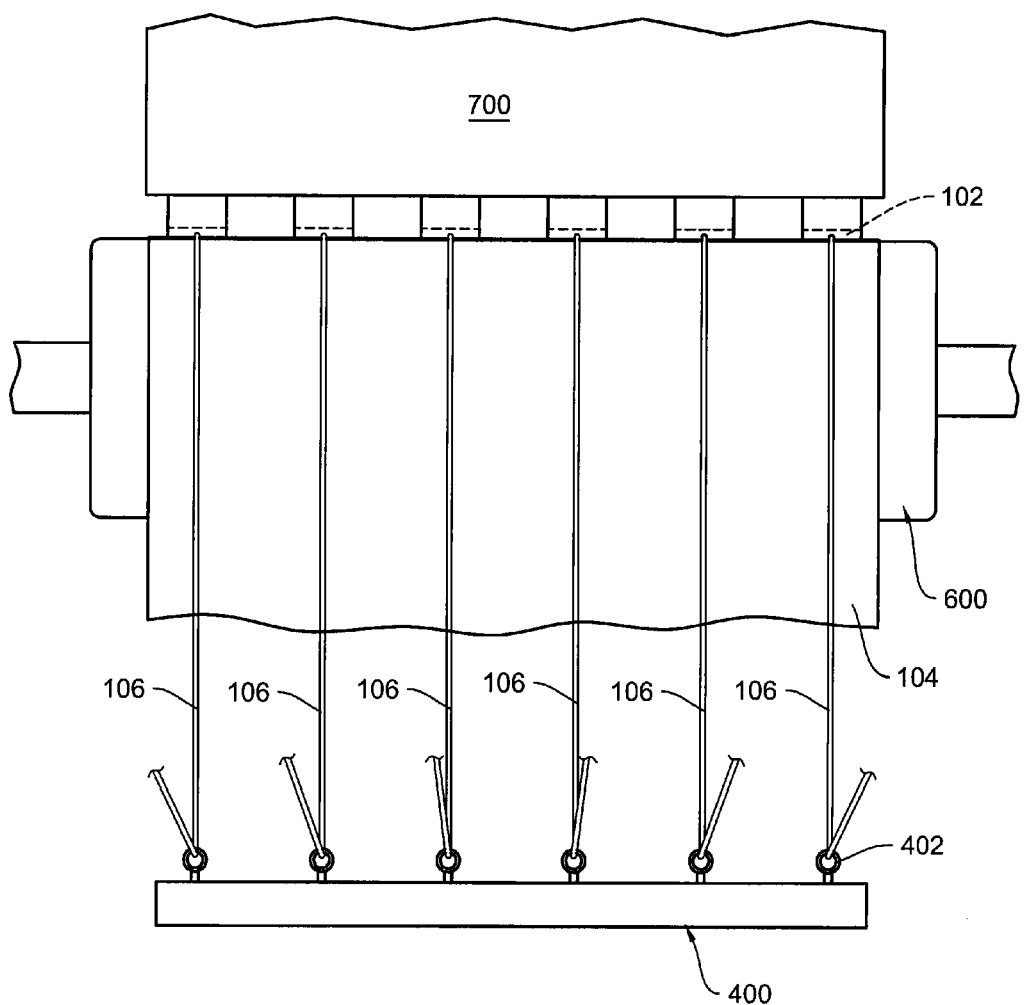
FIG. 21 is a section along line 21-21 of FIG. 20.
Figure 22:
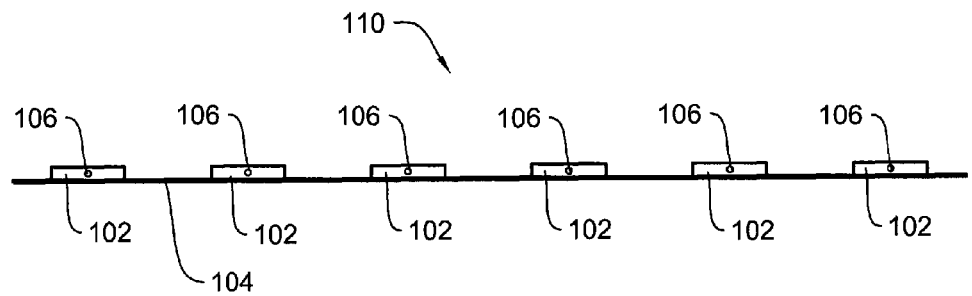
FIG. 22 is a section along line 22-22 of FIG. 20.
Figure 23:
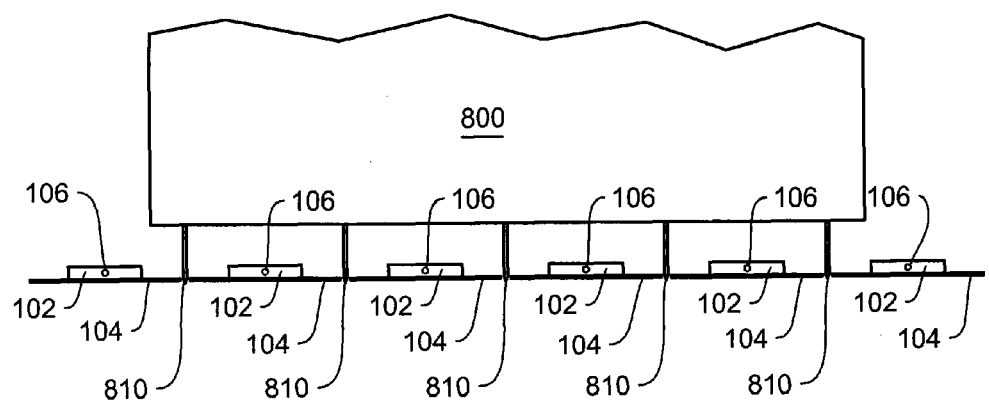
FIG. 23 is a section along line 23-23 of FIG. 20.

The adhesive is dispensed by the adhesive head in spaced rows onto the release liner 104 and over the aligned reinforcing strands 106 resulting in a strip 110 with spaced rows of adhesive bodies 102 with a reinforcing strand 106 extending longitudinally through each of the adhesive bodies 102 as illustrated in FIG. 21. Because the adhesive is dispensed from above onto the release liner 104, it should be appreciated that the release liner 104 is oriented so that it is drawn through the system 200 with the bottom side D of the release liner 104 (i.e., the "tighter release value") facing up to receive the adhesive (see FIGS. 22-23). In the embodiment shown, the release liner 104 is thus wound onto the release liner roll 500 with the bottom release coating D (i.e., with the tighter release side) facing out. However, it should be appreciated that if the release liner roll 500 is wound with the bottom release coating D (i.e., the tight release side) facing in, the roll 500 may be unrolled in the opposite direction or oriented to present the bottom release coating D (i.e., the tight release side) to the adhesive dispenser 700.

After the adhesive has sufficiently cured, the sheet 110 is passed through the tape slitter 800 comprising a series of spaced blades 810 (FIG. 23) producing six separate strips of double sided strand reinforced PSA tape 100 with the desired width of release liner 104 on the bottom side. Each of the strips are directed over idler rollers to a traverse winder 900 supporting a removable core 18. The PSA tape strips 100 are traverse wound onto the cores 18 by the traverse winders 900 with the adhesive side down or inward toward the cores 18 as illustrated in FIGS. 17, 18 and 19.

Obviously, the width of the release liner 104 will vary depending on the number of rows of adhesive being deposited at one time and by the desired width of the release liner in relation to the adhesive body. Likewise the number of strand spools will vary depending on the number of strands 106 being used in each adhesive body and the number of rows of adhesive being deposited.

The adhesive head 700 (as illustrated in FIG. 21) is shown as a six slotted head depositing a rectangular bead of adhesive in spaced rows. The length of the slots and thus the width of the adhesive bead produced may vary as desired depending on the application. Likewise the thickness of the bead may be varied depending on the width of the slotted openings and the speed at which the system operates. It should be appreciated that rather than a slotted head, the adhesive head 700 may have round openings of different diameters to deposit round beads of adhesive of different diameters. Additionally, the adhesive head may have fewer slots or openings or more slots or openings. The adhesive heads 700 may be hot melt heads or cold liquid adhesive heads depending on the adhesive desired. Adhesive dispensing heads are available from various manufacturers, including, for example Nordson Corporation, Westlake Ohio.

Traverse winders 900 are also well known in the industry and are available from a variety of manufacturers including, for example, Independent Machine Company (IMC), Fairfield, N.J.

The system 200 may include various sensors disposed to detect breaks in the strands 106, the release liner 104, or to detect malfunctions of the adhesive head producing inconsistent adhesive application onto the release liner 104 as recognized and understood by those of skill in the art.

It should be appreciated that the system 200 is first threaded with the release liner 104 and the reinforcing strands 106 prior to dispensing the adhesive. Therefore, several feet of the release liner and reinforcing strands without any adhesive will be drawn through the system 200 and traverse wound on the cores 18 before the tape 100 with adhesive will start to be spooled. Accordingly, the system 200 may be programmed, to spiral wind the release liner 104 and reinforcing strands 106 onto the edge of the core 18 until the tape 100 with adhesive reaches the traverse winders 900 at which point the traverse winders 900 will begin to oscillate from side-to-side to traverse wind the tape 100 onto the core 18.

Figure 24:
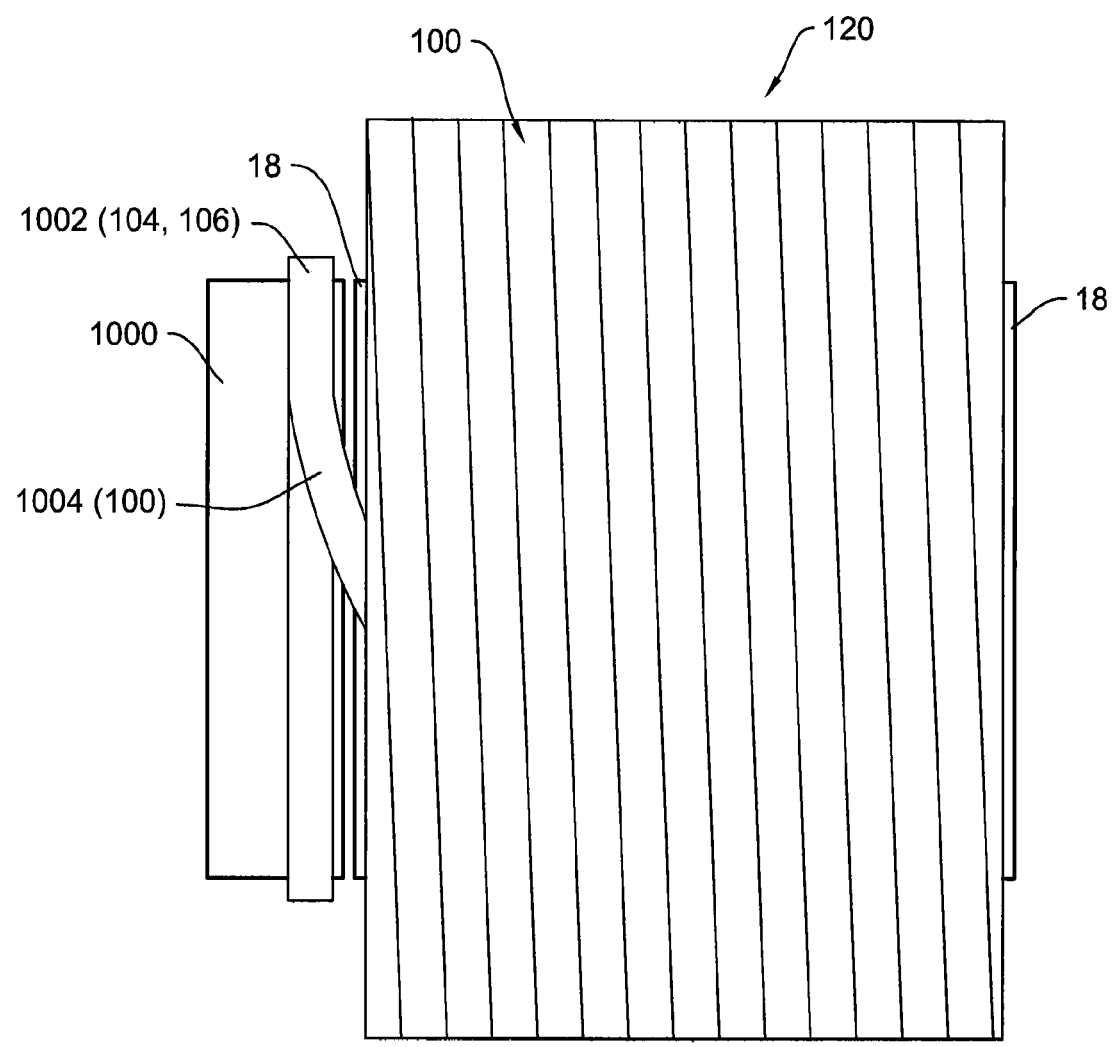
FIG. 24 is an elevation view showing a spool of traverse wound PSA tape and a an adjacent startup spool with of spiral wound length of release liner and reinforcing strand.

To avoid any portion of the spool 120 being wound with several feet of release liner and reinforcing strand without any adhesive, the traverse winders 900 may be loaded with core 18 to receive the tape 100 and a short startup core 1000 as illustrated in FIG. 24. In operation, the system 200 may be programmed to spiral wind onto to the startup core 1000, the a length 1002 (e.g., several feet) of the release liner 104 and reinforcing strands 106 (without any adhesive body), until the tape 100 (with the adhesive body 102) reaches the startup core 1000, at which point the system 200 is programmed to begin to oscillate to begin traverse winding the tape 100 (with adhesive body 102) onto the core 18. When the core 18 is fully traverse wound, the stringer 1004 of tape 100 extending between the spiral wound length 1002 on the startup core 1000 and the spool 120 of tape 100 traverse wound on the core 18, is simply cut resulting in a spool 120 that is fully traverse wound with double-sided, strand reinforced, PSA tape 100.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A spool of traverse wound double-sided pressure sensitive adhesive (PSA) tape, comprising:
    a) a core;
    b) a length of double-sided PSA tape, the tape comprising:
        (i) an adhesive body having a lower adhesive surface, an upper adhesive surface, a thickness and a width;
        (ii) a release liner having a top side, a bottom side, and a width, the top side of the release liner having a release coating with a first release value, the bottom side of the release liner having a release coating with a second release value, wherein the second release value is greater than the first release value, the width of the release liner having a width at least as wide as the width of the adhesive body, the bottom side of the release liner being adhered to the upper adhesive surface of the adhesive body along the length of the tape;
        (iii) at least one longitudinal reinforcing strand disposed longitudinally through the adhesive body along the length of the tape, the at least one longitudinal reinforcing strand having a strand tensile strength;
    (c) wherein the length of the tape is traverse wound onto the spool in successive winding layers with each successive winding layer producing an outer winding layer with the bottom side of its adhesive body crossing at an angle over the top side of the release liner of a preceding inner winding layer;
    (d) wherein the strand tensile strength is greater than a Resistance Bond of the outer winding layer to the preceding inner winding layer; and
    (e) wherein the spool includes a portion which is spiral wound, and wherein said spiral wound portion includes a length of the release liner and the at least one longitudinal strand without the adhesive body.

2. The spool of traverse wound double-sided PSA tape of claim 1 wherein the strand tensile strength is greater than the Resistance Bond by a factor of about 3 or more.

3. The spool of traverse wound double-sided PSA tape of claim 1 wherein the adhesive body includes a plurality of longitudinal reinforcing strands each disposed longitudinally through the adhesive body along the length of the tape, and wherein the strand tensile strength is a combined tensile strength of the plurality of longitudinal reinforcing strands.

4. The spool of traverse wound double-sided PSA tape of claim 3 wherein the combined strand tensile strength is greater than the Resistance Bond by a factor of about 3 or more.

5. The spool of traverse wound double-sided PSA tape of claim 1 wherein the second release value is greater than the first release value by a factor of about 3 or more.

6. The spool of traverse wound double-sided PSA tape of claim 1 wherein the at least one longitudinal strand comprises filament yarn.

7. The spool of traverse wound double-sided PSA tape of claim 6 wherein the filament yarn is polyester.

8. The spool of traverse wound double-sided PSA tape of claim 6 wherein the filament yarn is polypropylene.

9. The spool of traverse wound double-sided PSA tape of claim 8 wherein the filament yarn has a decitex of about 110.

10. The spool of traverse wound double-sided PSA tape of claim 1 wherein the at least one longitudinal strand is a monofilament.

11. A method of producing a double-sided pressure sensitive adhesive (PSA) tape, comprising:
   (a) drawing a release liner under an adhesive head, the release liner having a top side, a bottom side, and a width, the top side of the release liner having a release coating with a first release value, the bottom side of the release liner having a release coating with a second release value, wherein the second release value is greater than the first release value, and wherein the release liner is drawn under the adhesive head with the bottom side having the second release value facing the adhesive head;
   (b) drawing at least one reinforcing strand under the adhesive head, the reinforcing strand aligned with and disposed above the release liner, the at least one reinforcing strand having a strand tensile strength;
   (c) dispensing pressure sensitive adhesive (PSA) through the adhesive head over the at least one reinforcing strand and onto the release liner, thereby producing a PSA tape with an adhesive body having the at least one reinforcing strand extending longitudinally through the adhesive body;
   (d) traverse winding the PSA tape onto a core in successive winding layers with the adhesive body of the traverse wound PSA tape disposed inwardly toward the core, wherein each successive winding layer produces an outer winding layer with the bottom side of its adhesive body crossing at an angle over the top side of the release liner of a preceding inner winding layer;
   (e) wherein a tensile strength of the at least one reinforcing strand is greater than a Resistance Bond of the outer winding layer to the preceding inner winding layer;
   (f) spiral winding a length of the release liner and the at least one strand without the adhesive body, prior to traverse winding the PSA tape.

12. The method of claim 11 wherein the strand tensile strength is greater than the Resistance Bond by a factor of about 3 or more.

13. The method of claim 11 wherein the adhesive body includes a plurality of reinforcing strands and the tensile strength is a combined tensile strength of the plurality of reinforcing strands.

14. The method of claim 13 wherein the combined strand tensile strength is greater than the Resistance Bond by a factor of about 3 or more.

15. The method of claim 11 wherein the second release value is greater than the first release value by a factor of about 3 or more.

16. The method of claim 11 wherein the at least one strand comprises filament yarn.

17. The method of claim 16 wherein the filament yarn is polyester.

18. The method of claim 16 wherein the filament yarn is polypropylene.

19. The method of claim 16 wherein the filament yarn has a decitex of about 110.

20. The method of claim 11 wherein the strand is a monofilament.

21. The method of claim 11 wherein a plurality of spaced reinforcing strands are drawn under the adhesive head.

22. The method of claim 21 wherein a plurality of spaced rows of adhesive are dispensed over each of the plurality of spaced reinforcing strands, thereby producing a strip with a plurality of spaced adhesive body rows each having a reinforcing strand extending longitudinally through each of the plurality of adhesive body rows.

23. The method of claim 22 including slitting the strip into a plurality of separate PSA tape strips.

24. The method of claim 23 comprising a plurality of cores wherein each of the plurality of PSA tape strips is separately traverse wound onto one of the cores in successive winding layers with the adhesive body of the traverse wound PSA tape strips disposed inwardly toward the cores.

25. The method of claim 11 wherein the step of spiral winding the length of the release liner and the at least one strand without the adhesive body, prior to traverse winding the PSA tape, is at one end of the core.

26. The method of claim 11 wherein the step of spiral winding the length of the release liner and the at least one strand without the adhesive body is on a startup core disposed adjacent the core, prior to traverse winding the PSA tape onto the core.

* * * * *